US011377377B2

(12) United States Patent
Wang et al.

(10) Patent No.: US 11,377,377 B2
(45) Date of Patent: Jul. 5, 2022

(54) HORIZONTAL-VERTICAL DRAIN BOARD-FLOCCULATION VACUUM PRELOADING SEDIMENT TREATMENT METHOD

(71) Applicants: Jun Wang, Wenzhou (CN); Hongtao Fu, Wenzhou (CN); Yuanqiang Cai, Wenzhou (CN); Peng Wang, Wenzhou (CN); Guohui Yuan, Wenzhou (CN); Jinqiang Jin, Wenzhou (CN); Haidong Xu, Wenzhou (CN); Zhengde Xia, Wenzhou (CN); Junfeng Ni, Wenzhou (CN); Ziyang Ggao, Wenzhou (CN); Qiang Ye, Wenzhou (CN); Youchang Lv, Wenzhou (CN); Zhi Guan, Wenzhou (CN); Ziwu Jiang, Wenzhou (CN); Zhijian Chen, Wenzhou (CN)

(72) Inventors: Jun Wang, Wenzhou (CN); Hongtao Fu, Wenzhou (CN); Yuanqiang Cai, Wenzhou (CN); Peng Wang, Wenzhou (CN); Guohui Yuan, Wenzhou (CN); Jinqiang Jin, Wenzhou (CN); Haidong Xu, Wenzhou (CN); Zhengde Xia, Wenzhou (CN); Junfeng Ni, Wenzhou (CN); Ziyang Ggao, Wenzhou (CN); Qiang Ye, Wenzhou (CN); Youchang Lv, Wenzhou (CN); Zhi Guan, Wenzhou (CN); Ziwu Jiang, Wenzhou (CN); Zhijian Chen, Wenzhou (CN)

(73) Assignee: Wenhou University, Wenzhou (CN)

( * ) Notice: Subject to any disclaimer, the term of this patent is extended or adjusted under 35 U.S.C. 154(b) by 37 days.

(21) Appl. No.: 16/910,079

(22) Filed: Jun. 24, 2020

(65) Prior Publication Data

US 2021/0403351 A1    Dec. 30, 2021

(51) Int. Cl.
*B01D 35/06* (2006.01)
*C02F 1/52* (2006.01)
(Continued)

(52) U.S. Cl.
CPC ............ *C02F 1/5227* (2013.01); *B01D 35/06* (2013.01); *C02F 1/004* (2013.01); *C02F 1/463* (2013.01)

(58) Field of Classification Search
CPC ........ C02F 1/004; C02F 1/463; C02F 1/5227; B01D 35/06
(Continued)

(56) References Cited

U.S. PATENT DOCUMENTS 4,604,174 A * 8/1986 Bollinger ............... B01D 35/06
                                                         204/518
4,755,305 A * 7/1988 Fremont ................ B01D 35/06
                                                         205/746
(Continued)

FOREIGN PATENT DOCUMENTS

WO    WO 87/01057    *  2/1987

Primary Examiner — Christopher Upton (57) ABSTRACT

A horizontal-vertical drain board-flocculation vacuum preloading sediment treatment method, including (1) electro-osmotic electrodes disposed on the top and bottom of each reinforcing bar of the reinforced frame; (2) after the sediment is blown to the bottommost layer of vacuum preloading tank, the support is fitted over each reinforced frame, and the clips are fastened; (3) the transverse drain board passes through the support, one end of transverse drain board is connected to a curved tube; (4) repeat Step 2 and Step 3 until the sediment is blown to the surface layer of vacuum preloading tank; (5) a vertical drain board is arranged vertically between two adjacent rows of reinforced frames; (6) the curved tube is connected to the first junction block through the second junction block, and then the geotextile (Continued)

and sealing film are laid, the vacuum pump and power supply are switched on at last.

10 Claims, 5 Drawing Sheets (51) Int. Cl.
*C02F 1/463* (2006.01)
*C02F 1/00* (2006.01)

(58) Field of Classification Search
USPC .............. 210/702, 748.01, 767, 243, 416.1
See application file for complete search history.

(56) References Cited

U.S. PATENT DOCUMENTS

| | | | |
|---|---|---|---|
| 10,272,481 B2 * | 4/2019 | Cai | B09C 1/02 |
| 10,370,814 B2 * | 8/2019 | Fu | E02D 3/12 |
| 2007/0267355 A1 * | 11/2007 | Jones | B01D 35/06 |
| | | | 210/243 |

* cited by examiner

HORIZONTAL-VERTICAL DRAIN BOARD-FLOCCULATION VACUUM PRELOADING SEDIMENT TREATMENT METHOD

BACKGROUND OF INVENTION

1. Field of the Invention

The present invention relates generally to a horizontal-vertical drain board-flocculation vacuum preloading sediment treatment method.

2. Description of Related Art

At present, in the treatment of soft foundation by vacuum preloading, the vacuum unit and sealed system form negative pressure, the vertical plastic drain board is used as vertical drain body, the negative pressure is transferred to the deep layer of earth body, forming a pressure difference between the drain board and outside, so that the water in the earth body flows through the pores of earth body. The drain board has much higher permeability than earth body, so the fluid is collected in the drain body and pumped out. Therefore, the vertical drain board shortens the drainage distance, the consolidation time of earth body is shortened a lot, the earth body is further strengthened, it is extensively used as an economic and reliable geomaterial in the soft soil treatment by vacuum preloading. However, the vacuum preloading using vertical drain boards has deficiencies in soft foundation treatment. For the well resistance and smear effect in the course of vacuum pumping, the degree of vacuum decays with depth and radial direction during transfer, especially the vacuum preloading using vertical drain boards, as the vacuum preloading induces vertical consolidation of earth body, the drain board is likely to bend, so that the vacuum transfer is hindered, and fine particles will enter the filter membrane and board core, choking the vertical drain board. Therefore, the reinforcement of the earth body at the bottom and far in radial direction is poor, earth columns are likely to be formed nearby the drain board, hindering the drainage path, inducing nonuniform consolidation of earth body, the average consolidation degree of the overall reinforced earth body is not high, resulting in non-ideal reinforcement effect.

SUMMARY OF THE INVENTION

In view of the deficiencies in the technology, the present invention is to provide a horizontal-vertical drain board-flocculation vacuum preloading sediment treatment method. The vacuum preloading structure used in the method has better structural stability, and the transversal displacement of earth body is smaller in the implementation process, the vacuum transitivity is better, and the soil stabilization effect is better.

For this reason, A horizontal-vertical drain board-flocculation vacuum preloading sediment treatment method provided by the present invention, comprising a vacuum preloading tank, a vacuum pump, a plurality of rows of transverse drain pipe and a plurality of lines of vertical drain board; the vertical drain boards are collectively connected to a transverse drain pipe; the transverse drain pipe is collected by a first junction block and connected to the vacuum pump; the vacuum preloading tank is filled with soil samples in operating state; the vacuum preloading tank is covered with a geotextile and a sealing film; there are multiple rows of transverse reinforcement and multiple lines of vertical reinforcement disposed in the vacuum preloading tank; there is an insulating support at the junction of the transverse reinforcement and vertical reinforcement; the insulating support isolates the transverse reinforcement from the vertical reinforcement; each row of the transverse reinforcements is provided with the transverse drain board; the transverse drain board passes through the insulating support; the vertical drain board is disposed between two adjacent vertical reinforcements; the vertical drain board passes through the insulating support; the operation comprises the following steps:

Step 1: the transverse reinforcements and vertical reinforcements pass through the insulating support to form a reinforced frame;

Step 2: the anode and cathode of electro-osmotic power supply are connected to the combination of vertical reinforcements apart from each other; the vertical reinforcements passing through the same insulating support are one set, the electro-osmotic electrode is connected to the power supply through a conductor;

Step 3: the vertical drain board abuts against the vertical reinforcement and vertically passes through the insulating support, the upper end of vertical drain board is collectively connected to the transverse drain pipe;

Step 4: the sediment is fed into the vacuum preloading tank, whenever the height of a row of insulating supports is reached, the transverse drain board is put through the insulating support, and one end of transverse drain board is connected to a curved tube, the curved tube is collected by the a second junction block and connected to the first junction block; repeat Step 4 until the sediment is blown to the surface layer of vacuum preloading tank;

Step 5: the geotextile is laid before the sealing film is laid, and then the vacuum pump is turned on for vacuum preloading pump drainage;

Step 6: when the water is all pumped out, the pump drainage stops, the electro-osmotic power supply is switched on, so that the positive and negative electrodes are formed in the combination of the vertical reinforcements, the water concentrates in the combination of vertical reinforcements connected to cathode, and the vacuum pump is turned on for vacuum preloading pump drainage;

More particularly, wherein the Step 4, the sediment delivery conduit is connected to the flocculant delivery conduit, while the sediment pumping device feeds the sediment into the vacuum preloading tank through the sediment delivery conduit, the flocculant pumping device pumps flocculant into the sediment delivery conduit through the flocculant delivery conduit, the vacuum preloading pump drainage is performed after a period of standing of mud.

The technical proposal has the following effects:

1. The vertical drain board and transverse drain board are fixed by the reinforced frame composed of vertical reinforcements, transverse reinforcements and insulating supports, to prevent the transverse drain board from bending in the consolidation process, the vacuum transitivity is better, and the reinforced frame and supports reinforce and support the earth body to some extent.

2. The vertical drain boards and transverse drain boards form meshes, the soil stabilization effect is better.

3. A frame system with transverse reinforcements and vertical reinforcements is laid, and the insulating support at the transverse reinforcement and vertical reinforcement isolates the reinforcing bars, the electro-osmotic electrode is connected to the vertical reinforcement, so that the reinforced frame can assist electro-osmotic drainage, pumping the water collected at the vertical reinforcement connected to cathode, increasing the drainage efficiency, and the complete reinforced frame is left in the earth body after pump drainage, the earth body is reinforced better.

4. While the pumping device delivers sediment to the sediment delivery conduit, another pumping device is actuated to feed the flocculant into the sediment delivery conduit through the flocculant injection tube, the sediment and flocculant are mixed at the end of conduit and pumped into the tank, so that the soil in the sediment flocculates to form large grained agglomerates, preventing the soil from silting up the drain board, and the segregated water can be discharged more smoothly and thoroughly.

DETAILED DESCRIPTION OF THE INVENTION

As shown in FIGS. 1-5, the horizontal-vertical drain board-flocculation vacuum preloading sediment treatment method provided by the present invention comprises a vacuum preloading tank 1, a vacuum pump 2, multiple rows of transverse drain board 9 and multiple lines of vertical drain board 4. The vertical drain boards 4 are collectively connected to a transverse drain pipe 3, the transverse drain pipe 3 is collected by the first junction block 19 and connected to the vacuum pump 2. The vacuum preloading tank 1 is filled with soil samples in operating state. The vacuum preloading tank 1 is covered with a geotextile 5 and a sealing film 6. There are multiple rows of transverse reinforcement 71 and multiple lines of vertical reinforcement 72 disposed in the vacuum preloading tank 1. The height of vertical reinforcements 72 is lower than the vacuum preloading tank (the settlement of earth body is about 30%, so the height of the reinforced frame is approximately composed of the vertical reinforcements at 70% of the height of earth body in the vacuum preloading tank). An insulating support 8 is disposed at the junction of the transverse reinforcements 71 and vertical reinforcements 72. The insulating support 8 isolates the transverse reinforcements 71 from vertical reinforcements 72. Each row of the transverse reinforcements 71 is provided with the transverse drain board 9. The transverse drain board 9 passes through the insulating support 8. The vertical drain board 4 is disposed between two adjacent vertical reinforcements 72. The vertical drain board 4 passes through the insulating support 8, the operation comprises the following steps.

Step 1: The transverse reinforcements 71 and vertical reinforcements 72 pass through the insulating support 2 to form a reinforced frame;

Step 2: The anode and cathode of electro-osmotic power supply 15 are connected to the combination of vertical reinforcements 72 apart from each other. If a combination of vertical reinforcements 72 is connected to the anode, the next combination of vertical reinforcements 72 is connected to the cathode, the vertical reinforcements passing through the same insulating support 8 are one set, the electro-osmotic electrode 13 is connected to the power supply through a conductor 14.

Step 3: The vertical drain board 4 abuts against the vertical reinforcements 72 and vertically passes through the insulating support 8, the upper end of vertical drain board 4 is collectively connected to the transverse drain pipe 3.

Step 4: The sediment is fed into the vacuum preloading tank 1, whenever the height of a row of insulating supports 8 is reached, the transverse drain board 9 is put through the insulating support 8, and one end of transverse drain board 9 is connected to a curved tube 10, the curved tube 10 is collected by the second junction block 20 and connected to the first junction block 19. Repeat Step 4 until the sediment is blown to the surface layer of vacuum preloading tank 1. In this embodiment, there can be multiple transverse drain boards 9 and vertical drain boards 4 through conduit, the specific quantity can be determined according to the width and height of vacuum preloading tank.

Step 5: The geotextile 5 is laid before the sealing film 6 is laid, and then the vacuum pump 2 is turned on for vacuum preloading pump drainage.

Step 6: When the water is all pumped out, the pump drainage stops, the electro-osmotic power supply 15 is switched on, so that the positive and negative electrodes are formed in the combination of the vertical reinforcements 72, the water concentrates in the combination of vertical reinforcements 72 connected to cathode, and the vacuum pump 2 is turned on for vacuum preloading pump drainage.

Figure 1:
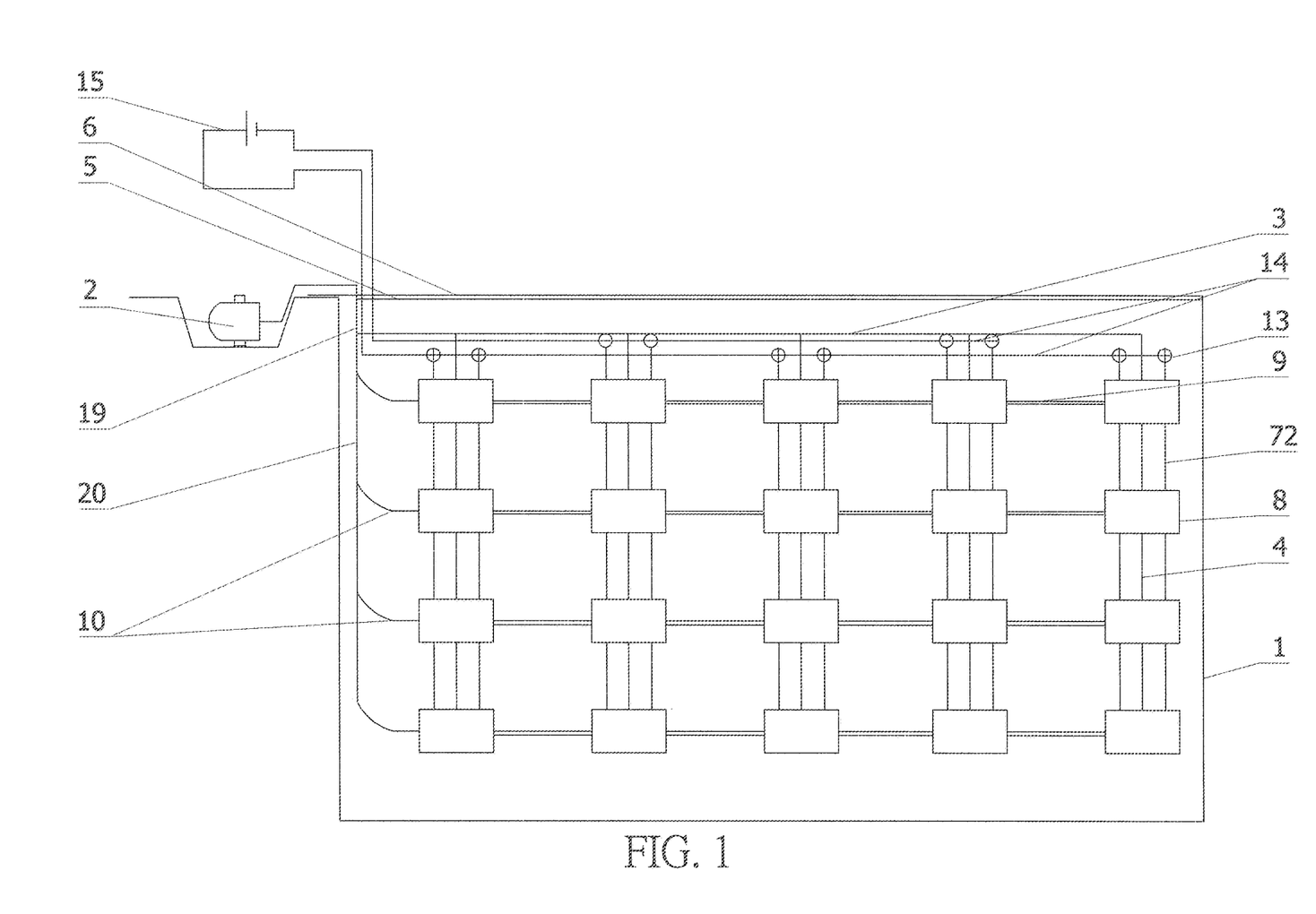
FIG. 1 is a structural representation of the vacuum preloading structure with combined layout of horizontal and vertical drain boards provided by the present invention.
Figure 2:
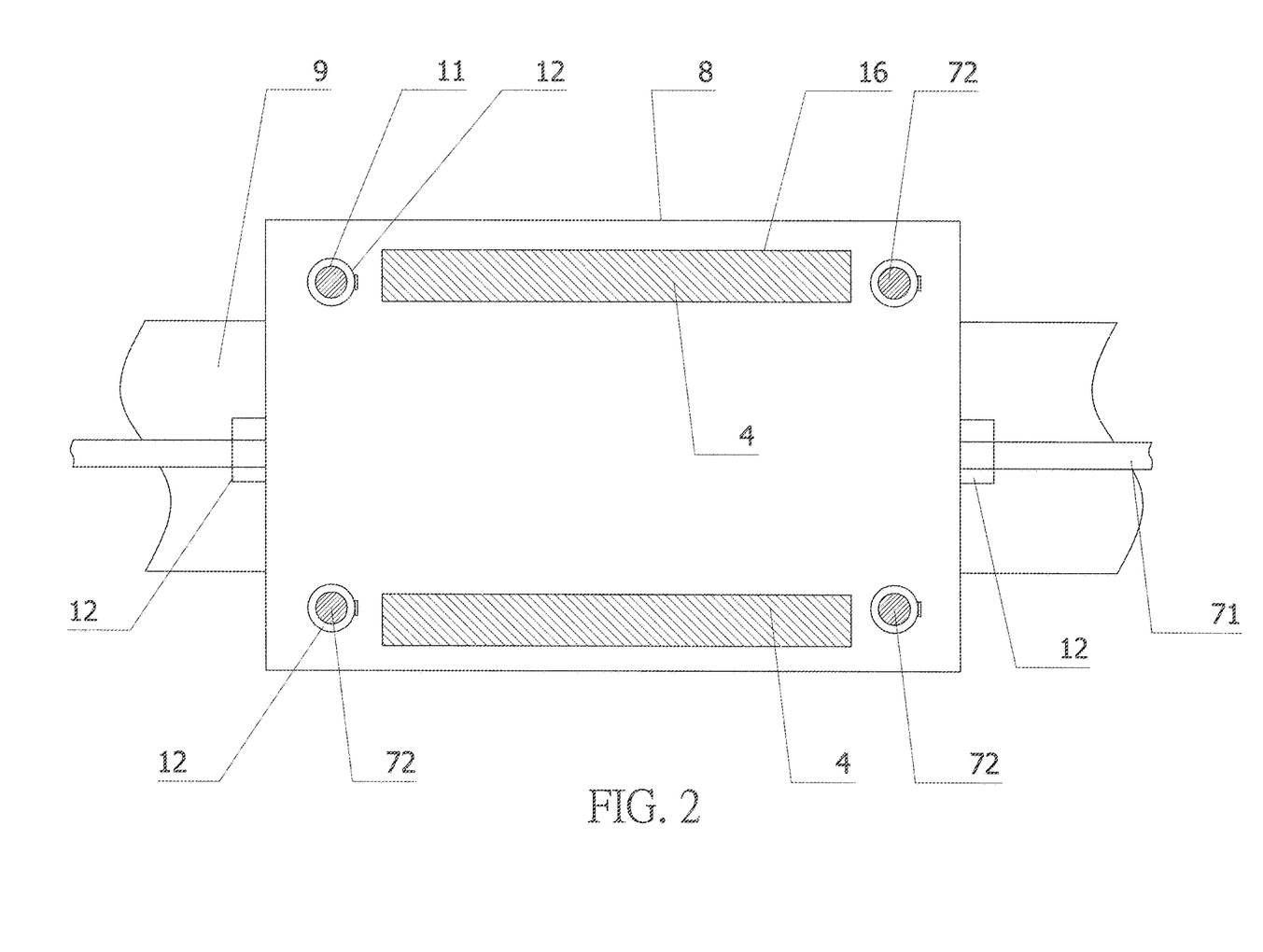
FIG. 2 is a structural representation in partial top view of reinforced frame, support and transverse drain board in FIG. 1.
Figure 3:
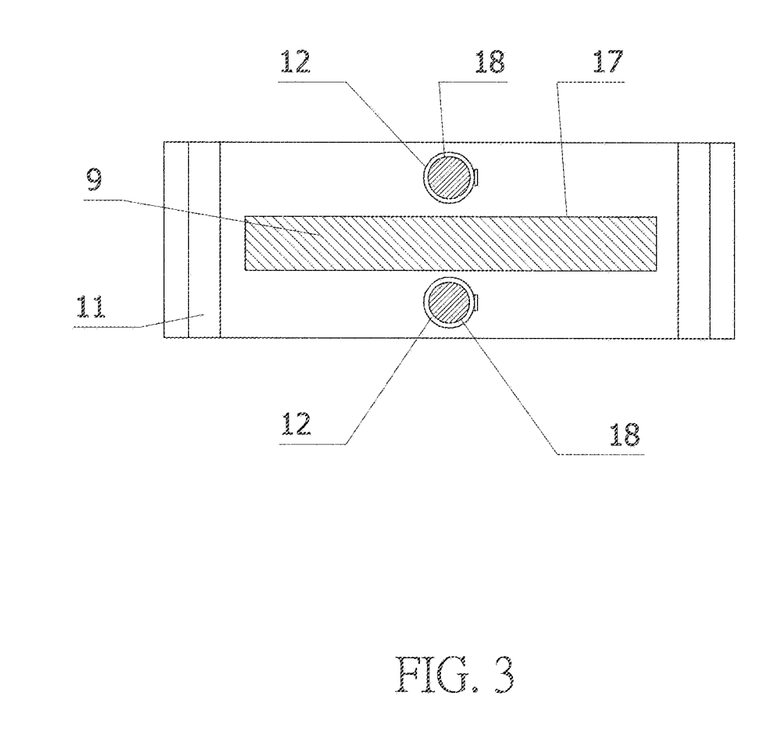
FIG. 3 is an end view of FIG. 2.
Figure 4:
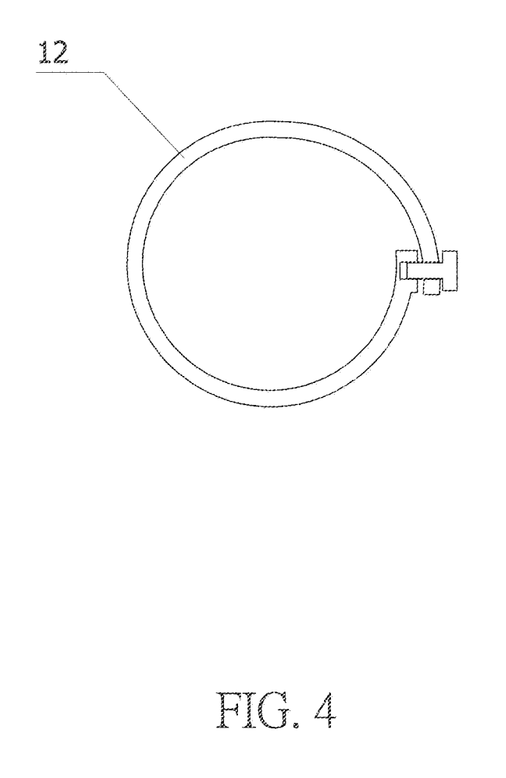
FIG. 4 is a structural plan diagram of clip.
Figure 5:
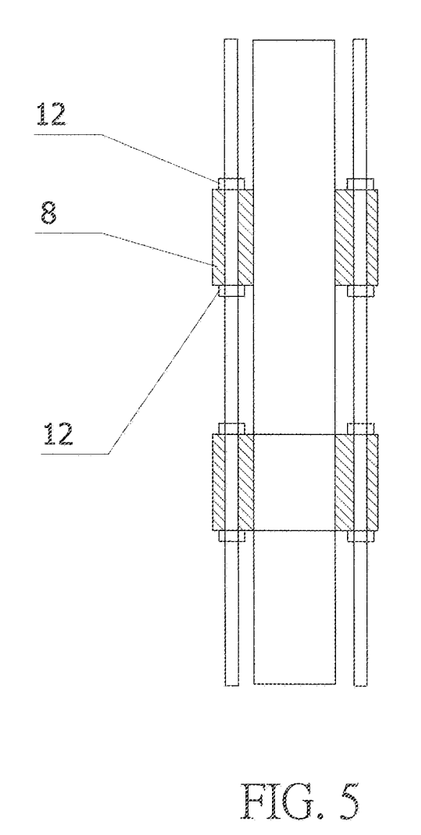
FIG. 5 is a structural representation of vertical reinforcement and vertical drain board through the insulating support.

The method is applicable to the embodiments where the depth of vacuum preloading tank 1 is larger than 5 m, and the width of vertical drain board 4 is 100 mm, the spacing between vertical drain boards 4 is 0.5-1 m.

As disclosed in FIG. 1, in order to enhance the effect of pump drainage. In Step 4, the sediment delivery conduit is connected to the flocculant delivery conduit, while the sediment pumping device feeds the sediment into the vacuum preloading tank through the sediment delivery conduit, the flocculant pumping device pumps flocculant into the sediment delivery conduit through the flocculant delivery conduit, the vacuum preloading pump drainage is performed after a period of standing of mud. The method makes the soil in the sediment flocculate to form large grained agglomerates, to avoid the soil silting up the drain board, and the segregated water can be discharged more smoothly and thoroughly.

As disclosed in FIGS. 1-5, there are vertical drain board plug holes 16 opened vertically on both sides of the insulating support 8, there are vertical reinforcement plug holes 11 opened in two side ends of vertical drain board plug hole 16. There are transverse drain board plug holes 17 opened transversely in the insulating support 8. There are transverse reinforcement plug holes 18 opened transversely on upper and lower sides of transverse drain board plug hole 17. The vertical drain board 4 vertically passes through two vertical drain board plug holes 11 of each insulating support 8. The vertical reinforcement 72 passes through the vertical reinforcement plug hole 11. The transverse drain board 9 transversely passes through the transverse drain board plug hole 17. The transverse reinforcement 71 passes through the transverse reinforcement plug hole 18. The transverse reinforcement 71 and vertical reinforcement 72 are fastened to the insulating support 8 by a clip 12. The clip 12 is stuck in both ends of the transverse reinforcement plug hole 18 and vertical reinforcement plug hole 11. The structure of the insulating support 8 is favorable for quick interpenetration to form a reinforced frame, which is fixed by clip 12, so as to form a very steady drain board supporting system rapidly, and the electro-osmotic electrode is integrated into the reinforced frame, and the vertical reinforcements 72 and transverse reinforcements 71 connected to different electrodes are separated.

As shown in FIG. 1, in order to remove the water content in the earth body more thoroughly and efficiently, Step 7 is created after Step 6, the anode and cathode connected the combination of vertical reinforcements 72 are switched over for electroosmosis treatment, and the vacuum pump 2 is turned on again for vacuum preloading pump drainage. The Step 6 and Step 7 are implemented repeatedly until there is no water discharged.

We claim:

1. A horizontal-vertical drain board-flocculation vacuum preloading sediment treatment method, comprising
a vacuum preloading tank, a vacuum pump, a plurality of rows of transverse drain pipe and a plurality of lines of vertical drain board;
wherein the vertical drain boards are collectively connected to a transverse drain pipe; the transverse drain pipe is collected by a first junction block and connected to the vacuum pump; the vacuum preloading tank is filled with soil samples in operating state; the vacuum preloading tank is covered with a geotextile and a sealing film;
a plurality of rows of transverse reinforcement and a plurality of lines of vertical reinforcement are disposed in the vacuum preloading tank; an insulating support is disposed at a junction of the transverse reinforcement and the vertical reinforcement; the insulating support isolates the transverse reinforcement from the vertical reinforcement; each row of the transverse reinforcements is provided with the transverse drain board, and the transverse drain board passes through the insulating support; the vertical drain board is disposed between two adjacent vertical reinforcements, and the vertical drain board passes through the insulating support;
the operation includes the following steps:
step 1: passing the transverse reinforcements and vertical reinforcements on the insulating support to form a reinforced frame;
step 2: connecting anode and cathode of an electro-osmotic power supply to a combination of the vertical reinforcements apart from each other; wherein the vertical reinforcements passing through the same insulating support are one set, an electro-osmotic electrode is connected to the power supply through a conductor;
step 3: placing the vertical drain board close to the vertical reinforcement and vertically passing through the insulating support, wherein an upper end of the vertical drain board is collectively connected to the transverse drain pipe;
step 4: transporting the sediment into the vacuum preloading tank, whenever the height of a row of insulating supports is reached, the transverse drain board is put through the insulating support, and one end of transverse drain board is connected to a curved tube, the curved tube is collected by a second junction block and connected to the first junction block; repeat step 4 until the sediment is blown to the surface layer of vacuum preloading tank;
step 5: laying the geotextile, then laying the sealing film, and finally turning on the vacuum pump for vacuum preloading pump drainage;
step 6: stopping the pump drainage after the pumped water is exhausted, turning on the electro-osmotic power supply, so that the anode and cathode are formed in the combination of the vertical reinforcements, the water concentrates in the combination of vertical reinforcements connected to cathode, and the vacuum pump is turned on for vacuum preloading pump drainage.

2. The horizontal-vertical drain board-flocculation vacuum preloading sediment treatment method defined in claim 1, in step 4, a sediment delivery conduit is connected to a flocculant delivery conduit, while the sediment pumping device feeds the sediment into the vacuum preloading tank through the sediment delivery conduit, a flocculant pumping device pumps flocculant into the sediment delivery conduit through the flocculant delivery conduit, the vacuum preloading pump drainage is performed after a period of standing of mud.

3. The horizontal-vertical drain board-flocculation vacuum preloading sediment treatment method defined in claim 2, wherein both sides of the insulating support are vertically provided with vertical drain board plug holes, and both ends of the vertical drain board plug hole are provided with vertical reinforcement plug holes; the insulating support is transversely provided with transverse drain board plug holes, upper and lower sides of the transverse drain board plug hole are transversely provided with transverse reinforcement plug holes; the vertical drain board vertically passes through two vertical drain board plug holes of each insulating support; the vertical reinforcement passes through the vertical reinforcement plug hole; the transverse drain board transversely passes through the transverse drain board plug hole; the transverse reinforcement passes through the transverse reinforcement plug hole.

4. The horizontal-vertical drain board-flocculation vacuum reloading sediment treatment method defined in claim 1, wherein the depth of the vacuum preloading tank is larger than 5 m.

5. The horizontal-vertical drain board-flocculation vacuum preloading sediment treatment method defined in claim 4, wherein a step 7 is created after the step 6, the anode and cathode connected to the combination of vertical reinforcements are switched over for electroosmosis treatment, and the vacuum pump is turned on again for vacuum preloading pump drainage; the step 6 and step 7 are implemented repeatedly until there is no water discharged.

6. The horizontal-vertical drain board-flocculation vacuum preloading sediment treatment method defined in claim 4, wherein the transverse reinforcements and vertical reinforcements are fastened to the insulating support by clips, the clips are stuck in both ends of the transverse reinforcement plug holes and vertical reinforcement plug holes.

7. The horizontal-vertical drain board-flocculation vacuum preloading sediment treatment method defined in claim 1, wherein each of the transverse drain boards is transversely connected to a curved tube, the curved tube is collected by a second junction block and connected to the first junction block.

8. The horizontal-vertical drain board-flocculation vacuum preloading sediment treatment method defined in claim 7, wherein the step 7 is created after the step 6, the anode and cathode connected to the combination of vertical reinforcements are switched over for electroosmosis treatment, and the vacuum pump is turned on again for vacuum preloading pump drainage; the step 6 and step 7 are implemented repeatedly until there is no water discharged.

9. The horizontal-vertical drain board-flocculation vacuum preloading sediment treatment method defined in claim 1, wherein the step 7 is created after the step 6, the anode and cathode connected to the combination of vertical reinforcements are switched over for electroosmosis treatment, and the vacuum pump is turned on again for vacuum preloading pump drainage; the step 6 and step 7 are implemented repeatedly until there is no water discharged.

10. The horizontal-vertical drain board-flocculation vacuum preloading sediment treatment method defined in claim 1, wherein the transverse reinforcements and vertical reinforcements are fastened to the insulating support by clips, the clips are stuck in both ends of the transverse reinforcement plug holes and vertical reinforcement plug holes.

* * * * *